Patented Aug. 12, 1947

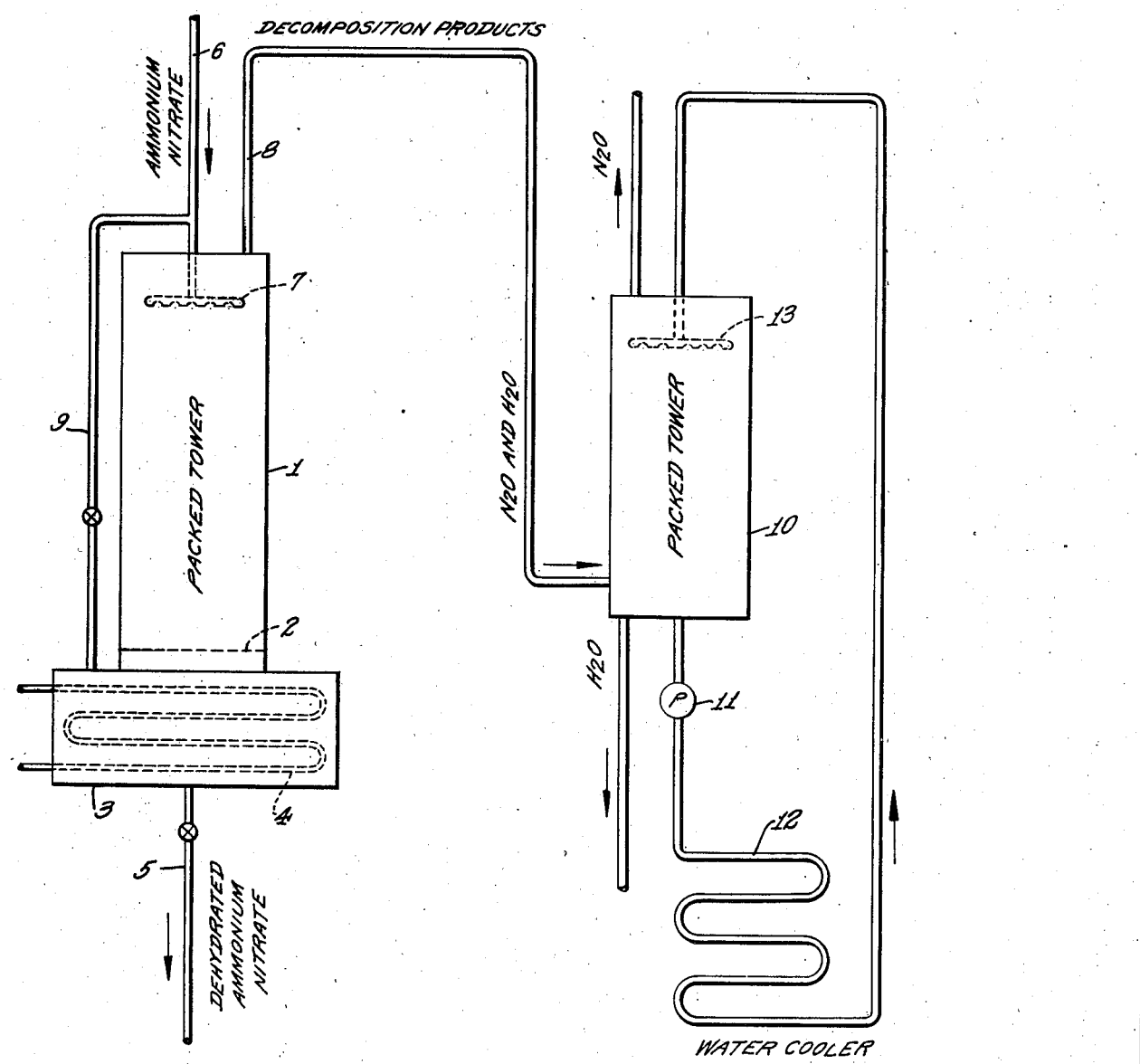

2,425,582

UNITED STATES PATENT OFFICE 2,425,582

PRODUCTION OF NITROUS OXIDE

Raymond A. Vingee, Geddes, N. Y., assignor to The Solvay Process Company, New York, N. Y., a corporation of New York Application May 24, 1945, Serial No. 595,520

11 Claims. (Cl. 23—158)

This invention relates to nitrous oxide and more particularly to an improved process for the production of nitrous oxide.

Heretofore, it has been proposed to manufacture nitrous oxide ($N_2O$) by introducing ammonium nitrate into a retort maintained at a temperature around 250° C., whereby the nitrate is decomposed into nitrous oxide, water vapor and various other decomposition products, and purifying the evolved gases to separate the nitrous oxide in relatively pure form from the other constituents of the gases. In such processes, the gaseous products of decomposition carry from the retorts considerable amounts of entrained ammonium nitrate, which must be removed therefrom during the purifying operations and which is lost unless special recovery procedure is resorted to. Further, the heat present in the evolved decomposition products is largely wasted and the prior art processes are not well adapted for continuous operation.

It is an object of this invention to provide an improved process for the production of nitrous oxide by decomposition of ammonium nitrate, which process is not subject to the above disadvantages.

It is another object of the invention to provide a process for the production of nitrous oxide which is particularly well adapted for continuous operation with minimum loss of heat and entrained ammonium nitrate.

It is a further object of the invention to provide a novel and improved process for the simultaneous production of nitrous oxide and dehydration of aqueous ammonium nitrate. Other objects and advantages will appear hereinafter.

In accordance with the invention, ammonium nitrate is decomposed in a zone to produce a hot gaseous mixture of decomposition products containing nitrous oxide and water vapor and molten or dissolved ammonium nitrate is flowed to the decomposition zone in intimate countercurrent contact with the hot decomposition products. I have found that by continuously introducing ammonium nitrate containing from 0.5% to 30% of water at a temperature from 30° to 200° C., into the top of a packed zone, flowing the introduced nitrate downwardly in the form of films of extensive surface area over the packing to a body of decomposing ammonium nitrate maintained at a temperature of from 220° to 290° C. and passing the gaseous products of decomposition evolved from the body of the nitrate upwardly through the packing, countercurrent to the nitrate flowing downwardly therethrough, nitrous oxide substantially free of entrained ammonium nitrate may be withdrawn from the packed zone and the process may be carried out continuously.

The ammonium nitrate may be substantially completely decomposed to produce nitrous oxide and water, or only a portion of the nitrate decomposed and the remainder dehydrated to produce an ammonium nitrate product of reduced water content. Where is is desired to decompose all of the ammonium nitrate, ammonium nitrate solution containing from 10% to 30% of water at a temperature of from 30° to 146° C., preferably 115° to 146° C., between the boiling point and salting out temperature of the solution, may advantageously be introduced into a packed tower at an average rate substantially equal to that at which decomposition is effected. The temperature of the ammonium nitrate is preferably raised to within the range of 120° to 175° C., while passing through the tower.

When it is desired to employ the process for the simultaneous production of nitrous oxide and dehydration of ammonium nitrate to obtain an ammonium nitrate product of reduced water content, ammonium nitrate containing from 0.5% to 10% of water at a temperature of from 95° to 200° C., preferably 145° to 190° C., between the boiling point and salting out temperature of the introduced nitrate composition, is preferably introduced into the tower, dehydrated ammonium nitrate is withdrawn from the body of decomposing nitrate and the rate of introduction of the nitrate into the tower and rate of withdrawal of dehydrated nitrate from the body are regulated so as to maintain the temperature of the body of nitrate within the range of 220° to 290° C. By regulating the water content and temperature of the introduced nitrate within these ranges, it is possible to obtain a substantially anhydrous ammonium nitrate product, i. e. a product containing less than 0.5% of water. The temperature of the ammonium nitrate is raised to within the range of 125° to 250° C., preferably 150° to 190° C., while passing through the tower.

In order to carry out the invention without substantial extraneous heating, the ammonium nitrate solution should contain not more than about 17% of water. Thus, for example, a solution containing 83% of ammonium nitrate and 17% of water may be substantially completely decomposed without substantial extraneous heating or cooling by introducing the solution into the packed tower at a temperature of about 125° C. Ammonium nitrate containing less than 17% of water may be decomposed without substantial extraneous heating or cooling by regulating the rate of introduction of the nitrate, the temperature and water content of the introduced nitrate and rate of withdrawal of hot undecomposed at least partially dehydrated nitrate from the body of decomposing nitrate so as to maintain the temperature of the body at the desired value. Temperature regulation of the body of nitrate may also be accomplished by adding small amounts of water to the tower.

In order to minimize explosion hazards, the temperature of the decomposing body of nitrate should not be permitted to exceed 290° C. and is preferably maintained in the neighborhood of 250° C. A heating or cooling medium may advantageously be passed in heat exchange relation to the body, e. g. through a pipe coil immersed therein to stabilize the temperature of the body at the desired value. Heat may thus be supplied for starting the process and when utilizing ammonium nitrate containing more than 17% of water. When employing ammonium nitrate of higher concentrations, it is usually desirable to employ a medium at a temperature having a cooling effect on the body to prevent the temperature of the nitrate body from rising above the desired point.

In carrying out the production of nitrous oxide in accordance with the invention, the hot gaseous products of decomposition are thoroughly scrubbed by countercurrent contact with the flowing films of ammonium nitrate solution. This scrubbing action eliminates or greatly minimizes losses of entrained ammonium nitrate in the gases and further serves to cool the gases and to heat the downwardly-flowing ammonium nitrate to or toward the temperature at which decomposition is effected. Further, the countercurrent contact of the ammonium nitrate with the gases at least partially dehydrates the nitrate before it reaches the body of decomposing nitrate, and thus promotes smoother decomposition.

The invention may be more fully understood from the accompanying drawing illustrating a diagrammatic arrangement of apparatus which may be employed for carrying out the process and the following detailed description.

In the drawing, reference numeral 1 designates a packed tower containing conventional packing such as ceramic rings or saddles supported on perforated plate 2 or other suitable foraminous support. Below the support 2 is located a vessel 3, which may be integral with the tower and which provides a decomposition zone of substantial volume. Vessel 3 is preferably equipped with coil 4 through which heating and cooling fluid may be circulated as desired, and valved outlet 5. The tower is further provided with ammonium nitrate inlet 6 equipped with distributor 7, and an outlet 8 for the gaseous products evolved during decomposition of the ammonium nitrate. Valved bypass 9 communicably connects inlet 6 with vessel 3 for introducing nitrate directly into vessel 3 without passing through the tower when desired, e. g. in starting the process in operation. Outlet 8 discharges upwardly through packed tower 10 countercurrent to water circulated by pump 11 from the bottom of the tower through water cooler 12 and distributor 13 into the top of the tower. The tower 10 is preferably operated so as to maintain the temperature of the circulating water at about 50° to 80° C. at the base of the tower to avoid significant loss of nitrous oxide by solution in the water. The column of packing in tower 1 is preferably of at least a height such that the temperature of the gaseous decomposition products is reduced, while ascending through the tower, to within about 20° C. of the temperature of the nitrate introduced at 6.

The nitrous oxide leaving tower 10 may be further purified by conventional methods such as scrubbing it with ferrous sulfate solution to remove nitric oxide and with caustic soda solution to remove other acidic impurities.

The following examples are further illustrative of the invention:

*Example 1*

A solution containing 83% by weight of ammonium nitrate and 17% of water is introduced at a temperature of 125° C. through distributor 7 into tower 1 and flowed downwardly in film form over the packing to a pool of decomposing nitrate at a temperature of about 250° C. in the lower portion of the tower below support 2. The decomposition products of ammonium nitrate constituted chiefly of nitrous oxide and water vapor at 250° C. containing entrained ammonium nitrate pass upwardly through the tower countercurrent to the downwardly-flowing films of ammonium nitrate. Owing to the intimate countercurrent contact between the ammonium nitrate films and the hot gases, the downwardly-flowing nitrate is gradually heated and dehydrated so that its water content is reduced to about 12% and its temperature is raised to about 135° C. by the time it reaches the bottom of the packing. The hot gases are cooled and thoroughly scrubbed by the descending ammonium nitrate and leave the tower through outlet 8 at a temperature of about 135° C. substantially free from entrained ammonium nitrate. By introducing the ammonium nitrate through the inlet 6 at substantially the rate at which it decomposes, the volume of the ammonium nitrate pool in the lower portion of the tower is maintained substantially constant. Since the amount of heat required to vaporize the water present in the incoming ammonium nitrate and to heat the nitrate to 250° C. is practically equal to the amount of heat liberated by decomposition of the ammonium nitrate and absorbed from the gases in the tower, the process may be operated in a continuous manner with practically no extraneous heating or cooling. Of course, extraneous heating may be resorted to in starting the reaction to raise the temperature of the ammonium nitrate in the bottom of the tower initially to about 250° C.

Where it is desired to employ ammonium nitrate containing substantially more than 17% of water, the heat necessary to vaporize the additional water may be supplied by passing an appropriate heating medium through a pipe coil immersed in the pool of reacting ammonium nitrate. Where the ammonium nitrate contains substantially less than 17% of water and it is desired to decompose all of the nitrate, it may be necessary to dissipate a portion of the heat of reaction, e. g. by passing a cooling medium through a pipe coil immersed in the pool of reacting ammonium nitrate, or by adding small amounts of water to the tower. It will be appreciated that the temperature conditions in the various portions of the tower and the pool of reacting ammonium nitrate may be maintained reasonably constant by regulation of the temperature and water content of the ammonium nitrate introduced into the tower.

Example 2

A solution containing 96.5% by weight of ammonium nitrate and 3.5% of water is introduced at a temperature of about 145° C. through distributor 7 into tower 1 and flowed downwardly in film form over the packing to a pool of decomposing nitrate at a temperature of about 250° C. below support 2 in the lower portion of the tower. The decomposition products of the ammonium nitrate constituted chiefly of nitrous oxide and water vapor at 250° C. containing entrained ammonium nitrate flow upwardly through the tower countercurrent to and in intimate contact with the films of ammonium nitrate as in Example 1, with the result that the downwardly-flowing nitrate is heated to a temperature of about 190° C. and dehydrated to a water content of about 1.4% by the time it reaches the bottom of the packing. The gaseous decomposition products are cooled and scrubbed by the descending ammonium nitrate and leave the tower through outlet 8 at a temperature of about 155° C. substantially free from entrained ammonium nitrate. For each mol of ammonium nitrate decomposed in the tower, about 1.6 mols of nitrate containing about .5% of water are withdrawn, preferably substantially continuously, through valved outlet 5. Since the amount of heat required to vaporize the water present in the incoming ammonium nitrate and to heat the nitrate to 250° C. is practically equal to the amount of heat liberated by decomposition occurring within the reaction pool and absorbed from the gases in the tower, the process may be operated in a continuous manner without substantial extraneous heating or cooling in accordance with this example. Obviously, ammonium nitrate of a water content greater or less than 3.5% may be utilized. The temperature of the incoming nitrate and the rate of withdrawal of dehydrated nitrate through outlet 5 may be regulated so as to maintain substantially constant temperature conditions within the reaction pool without substantial extraneous heating or cooling. However, it is frequently desirable to extract heat from the reaction pool, e. g. by passing a suitable cooling medium through a pipe coil immersed in the reaction pool of ammonium nitrate. If desired, heat may be supplied to the pool by passing a heating medium through the coil.

While a packed tower is preferably employed in carrying out the invention, other apparatus which secures intimate countercurrent contact between the gaseous decomposition products of the ammonium nitrate and the incoming nitrate may be employed. Further, when a packed tower is employed, it is not essential to carry out the decomposition of the ammonium nitrate in an unobstructed zone below the packing, i. e. the decomposition may be effected, partially or entirely, in the lower portion of the packed zone of the tower. For example, the packing may extend substantially to the base of the tower. Catalysts may be employed, if desired, to promote decomposition of the nitrate.

Thus it will be seen the invention provides a continuous process for the production of nitrous oxide by decomposition of ammonium nitrate, which process involves simultaneously cooling and scrubbing the hot gaseous products of decomposition and heating and dehydrating the incoming nitrate by countercurrent contact between the gases and flowing films of the nitrate. The invention minimizes losses of entrained ammonium nitrate in the gases, reduces heat losses, and promotes smooth decomposition of the nitrate. A heat balance may readily be obtained so that the process can be carried out adiabatically in a continuous manner without substantial extraneous heating or cooling.

The percentages of water in ammonium nitrate given herein are based on the combined weights of the water and nitrate.

Since certain changes may be made without departing from the scope of this invention, it is intended that the above description shall be interpreted as illustrative and not in a limiting sense.

I claim:

1. A process of producing nitrous oxide which comprises decomposing ammonium nitrate in a decomposition zone under temperature conditions within the range of 220° to 290° C., introducing liquefied ammonium nitrate containing 0.5% to 30% water at a temperature of from 30° to 200° C. into a second zone, and flowing the liquefied ammonium nitrate through said second zone to said decomposition zone in intimate countercurrent contact with the hot gaseous products of decomposition evolved from said decomposition zone.

2. A continuous process of producing nitrous oxide by decomposition of ammonium nitrate which comprises maintaining a body of molten ammonium nitrate under temperature conditions within the range of 220° to 290° C. whereby the ammonium nitrate is decomposed with evolution of nitrous oxide and water vapor, introducing molten ammonium nitrate containing from 0.5% to 30% of water at a temperature of 30° to 200° C. into a second zone, flowing the ammonium nitrate in dispersed form through said second zone and passing the hot gaseous products of decomposition from the decomposition zone through said second zone countercurrent to flow of ammonium nitrate therethrough whereby the temperature of the ammonium nitrate is raised to within the range of 120° to 250° C. while passing through said second zone.

3. A continuous process of producing nitrous oxide by decomposition of ammonium nitrate which comprises maintaining a body of molten ammonium nitrate under temperature conditions within the range of 220° to 290° C. whereby the ammonium nitrate is decomposed with evolution of nitrous oxide and water vapor, introducing molten ammonium nitrate containing from 10% to 30% of water at a temperature of from 30° to 146° C. into a packed zone located above said body of molten ammonium nitrate, flowing the introduced ammonium nitrate downwardly over the packing of said packed zone to said molten body and passing the hot gaseous products of decomposition evolved from said molten body of ammonium nitrate upwardly through said packing countercurrent to the flow of ammonium nitrate over the packing, whereby the temperature of the ammonium nitrate is raised to within the range of 120° to 175° C. and the nitrate is partially dehydrated while flowing over said packing.

4. A continuous process for simultaneously producing nitrous oxide and dehydrating ammonium nitrate which comprises maintaining a body of ammonium nitrate in a zone under temperature conditions within the range 220° to 290° C., introducing liquid ammonium nitrate containing from 0.5% to 10% of water at a temperature of 95° to 200° C. into a second zone, flowing the ammonium nitrate in film form through said second zone to said body of molten ammonium nitrate, passing the hot products of decomposition from said body of ammonium nitrate through said second zone countercurrent to flow of ammonium nitrate therethrough, and withdrawing at least partially dehydrated ammonium nitrate from said body.

5. A process as defined in claim 4 involving the step of passing a fluid medium in heat exchange relation to said body of molten ammonium nitrate and regulating the rate of introduction of ammonium nitrate to said second zone, the water content of the ammonium nitrate introduced, the rate of withdrawal of ammonium nitrate from said body, and the temperature of said fluid medium, to maintain the temperature of said body within the range of 220° to 290° C.

6. A continuous process for simultaneously producing nitrous oxide and dehydrating ammonium nitrate, which comprises maintaining a body of decomposing ammonium nitrate under temperature conditions within the range of from 220° to 290° C., introducing ammonium nitrate in liquid form containing from 0.5% to 10% of water at a temperature of 145° to 190° C. into a packed zone located above said body at a rate substantially in excess of the rate at which decomposition of the nitrate is effected, flowing the introduced ammonium nitrate downwardly over the packing of said zone to said body, passing the hot gaseous products of decomposition evolved from said body upwardly through said packed zone countercurrent to flow of ammonium nitrate therethrough, regulating the rate of introduction and the water content of the ammonium nitrate so that the nitrate is progressively dehydrated and heated to a temperature within the range of 150° to 190° C. while passing downwardly through said zone, and withdrawing ammonium nitrate containing less water than said introduced nitrate from said body at a rate sufficient to maintain the temperature of said body within the range of 220° to 290° C.

7. A continuous process of producing nitrous oxide by decomposition of ammonium nitrate, which comprises maintaining a body of decomposing ammonium nitrate under temperature conditions within the range of 220° to 290° C. whereby the ammonium nitrate is decomposed with evolution of nitrous oxide and water vapor, introducing liquid ammonium nitrate containing from 10% to 30% of water at a temperature within the range of 115° to 146° C. into a zone located above said body, flowing the introduced ammonium nitrate downwardly in film form through said zone to said body, and passing the hot gaseous products of decomposition evolved from said body upwardly through said zone countercurrent to flow of ammonium nitrate therethrough, whereby the nitrate is heated and partially dehydrated while passing through said zone, the average rate of introduction of the nitrate to said zone being approximately the average rate at which nitrate is decomposed in the process.

8. A process as defined in claim 7 in which the introduced ammonium nitrate contains about 17% of water and the temperature of the introduced nitrate is regulated to maintain the temperature of the body of decomposing nitrate within said range of 220° to 290° C. without substantial extraneous heating or cooling of said body and zone.

9. A process of producing nitrous oxide which comprises decomposing ammonium nitrate in a decomposition zone under temperature conditions within the range of 220° to 290° C., flowing liquefied ammonium nitrate in film form through a second zone to said decomposition zone and passing hot gaseous products of decomposition of the ammonium nitrate through said second zone countercurrent to flow of ammonium nitrate therethrough.

10. In a process of producing nitrous oxide by decomposition of ammonium nitrate in a decomposition zone, the improvement which comprises flowing liquefied ammonium nitrate to be decomposed toward said zone and passing hot gaseous products of said decomposition into intimate contact with said flowing nitrate.

11. In a process of producing nitrous oxide by decomposition of ammonium nitrate in a decomposition zone, the improvement which comprises flowing liquefied ammonium nitrate to be decomposed toward said zone and passing gaseous products of said decomposition from said zone into intimate countercurrent contact with said flowing ammonium nitrate.

RAYMOND A. VINGEE.

REFERENCES CITED

The following references are of record in the file of this patent:

UNITED STATES PATENTS

| Number | Name | Date |
|---|---|---|
| 2,111,276 | Castner | Mar. 15, 1938 |
| 1,673,238 | Godsey | June 12, 1928 |
| 1,650,519 | Isom | Nov. 22, 1927 |
| 1,896,945 | Friederich | Feb. 7, 1943 |